United States Patent [19]

Riebold

[11] 4,435,694

[45] Mar. 6, 1984

[54] AIR TERMINAL GUIDANCE SYSTEM

[76] Inventor: Elbert M. Riebold, P.O. Box 479, Columbus, Mont. 59019

[21] Appl. No.: 287,708

[22] Filed: Jul. 28, 1981

[51] Int. Cl.$^3$ .......................... G08G 5/00; B64F 1/18

[52] U.S. Cl. .......................... 340/953; 244/114 R; 340/951; 340/955

[58] Field of Search .......................... 340/26; 244/114 R; 362/62, 382

[56] References Cited

U.S. PATENT DOCUMENTS 2,602,850 7/1952 Cline .......................... 340/26

FOREIGN PATENT DOCUMENTS 299699 8/1929 United Kingdom .......................... 340/26
437794 11/1935 United Kingdom .......................... 340/26
686011 1/1953 United Kingdom .......................... 340/26

*Primary Examiner*—James J. Groody
*Attorney, Agent, or Firm*—Harvey B. Jacobson

[57] ABSTRACT

Four generally radially arranged base paths extending outwardly from the center of an airport are provided and each base path is defined by a pair of side-by-side rows of lights with a first row of lights comprising white lights and the second row of lights comprising predetermined color lights different from the color of each other second row of lights. In addition, intermediate radial paths extend outwardly from the airport between adjacent base paths and each intermediate path includes a single row of lights of a color corresponding to the color of lights in the second row of lights of one of the adjacent base paths. Also, a plurality of concentric circular paths extend about the airport at predetermined radial distances therefrom and intersect with the aforementioned base and intermediate paths. It is contemplated that each pair of side-by-side rows of lights may be flashed simultaneously or in sequence for identification of a specific base path and/or identification of the desired direction of movement of planes along a given base path.

3 Claims, 2 Drawing Figures

AIR TERMINAL GUIDANCE SYSTEM

BACKGROUND OF THE INVENTION

Many airports handle different types of aircraft ranging from highly sophisticated and complex military aircraft and commercial airliners to ultra-simple single-engine airplanes with little navigation or communication capabilities. Further, the pilot's experience and ability associated with these different aircraft also varies greatly. Accordingly, many pilots may not be familiar with the different systems involving the guidance of aircraft to a landing and the circling of aircraft in holding patterns.

Therefore, a need exists for an efficient airport or terminal guidance system comprising a standardized system which may be relied upon solely from a visual standpoint by the pilots of aircraft, including those equipped with little navigation or communication capabilities or more sophisticated aircraft encountering difficulties with operation of their more sophisticated navigation and communication systems.

Examples of air terminals guidance systems including some of the general structural and operational features of the instant invention are disclosed in U.S. Pat. Nos. 2,337,614, 2,350,407, 2,497,383, 2,602,850, 3,539,986, 3,868,778 and 3,964,015. However, these previously known forms of visual airport guidance systems do not include all of the improved operational and safety features of the instant invention incorporated therein.

BRIEF DESCRIPTION OF THE INVENTION

The airport guidance system of the instant invention incorporates the establishment of four radial basic guidance paths radiating outwardly from the center of the associated air terminal or airport in paths extending north, east, south and west from the air terminal. Each of these basic guidance paths includes a row of white lights extending therealong and a closely adjacent row of colored lights extending therealong with the color lights of each base guidance path comprising a color distinctively different from the color lights used in each of the other base guidance paths. In addition, the guidance system further incorporates an intermediate guidance path between each pair of adjacent base guidance paths and each intermediate guidance path comprises a single row of color lights of the same color as one of the colored row of lights in an adjacent base guidance path.

The four different colored rows of lights of the base guidance paths are to be standardized insofar as color match to a given compass direction and the guidance system further includes concentric circle paths of lights extending about the air terminal at different radial distances therefrom ranging up to 15 miles distance from the air terminal and with each of the circle paths of lights being of a distinctive color different from the color of lights in each of the other circular paths of lights.

By the utilization of such a standardized system, the pilot of an aircraft without any operative navigation or communication systems during at least minimum visibility conditions, may readily effect a proper landing approach to an air terminal from a distance in excess of 15 miles from the terminal.

The main object of this invention is to provide an air terminal guidance system of the visual type and including features which may be readily standardized and utilized by pilots of substantially all aircraft, under at least minimal visual conditions, to effect a proper approach to an air terminal.

Another object of this invention is to provide an air terminal guidance system in accordance with the preceding object and which may be utilized as a positive check to proper air terminal approach even by aircraft having navigational and communicational equipment in operating condition.

Another important object of this invention is to provide an air terminal guidance system whose operational features may be readily understood by substantially all pilots as a result of minimal explanation as to its usage.

A final object of this invention is to provide an air terminal guidance system in accordance with the preceding objects and which will conform to conventional forms of manufacture, be of simple construction and easy to use so as to provide a device that would be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
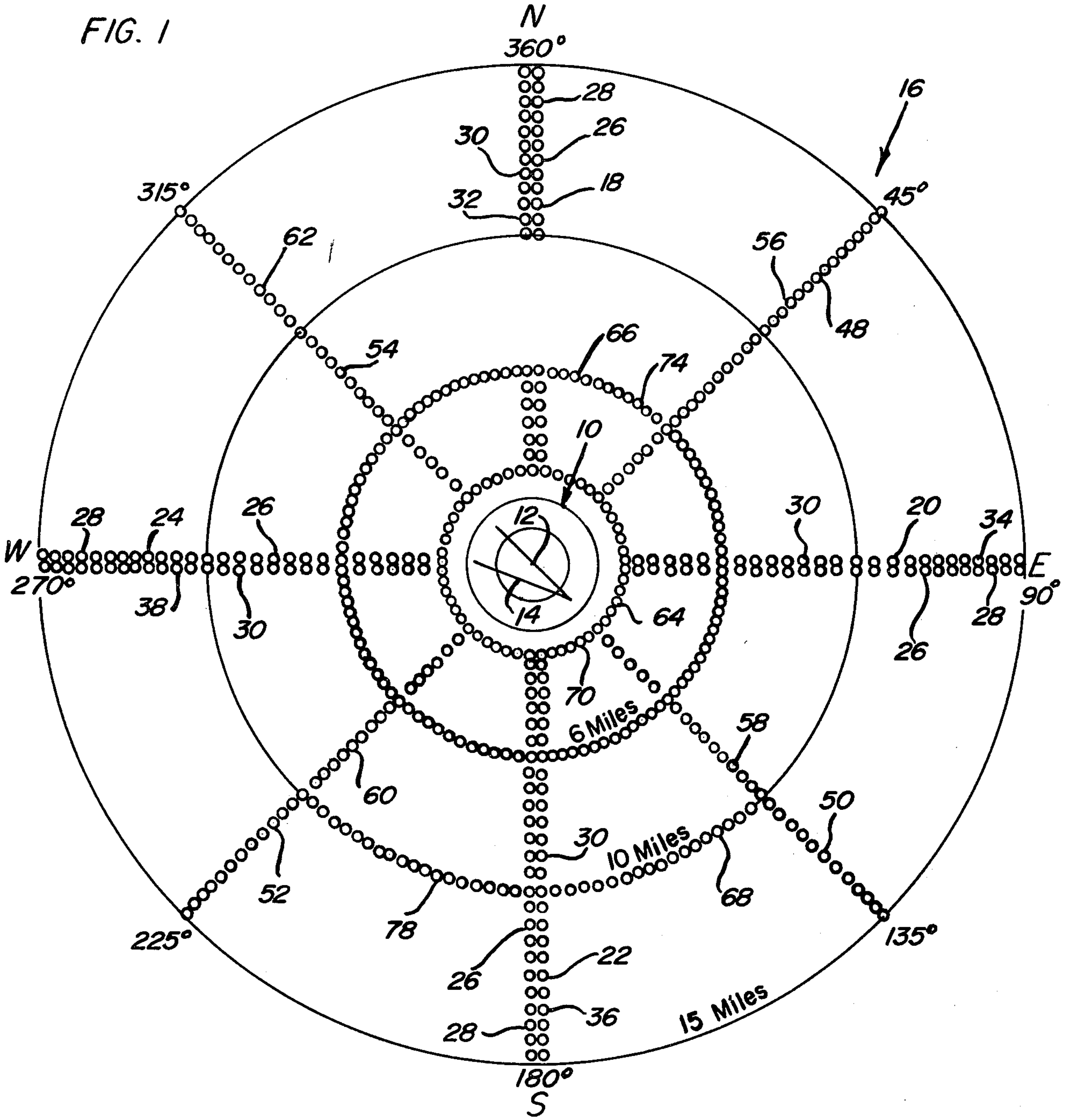
FIG. 1 is a plan view of the air terminal guidance system of the instant invention.

Referring now more specifically to the drawings, the numeral 10 generally designates an air terminal including individual runways 12 and 14. The air terminal guidance system of the instant invention is referred to in general by the reference numeral 16 and includes various paths of lights disposed about the air terminal 10. The system 16 includes four base paths 18, 20, 22 and 24 radiating outwardly from the air terminal 10 in north, east, south and west directions. The base paths each include the first row 26 of white lights 28 spaced therealong. In addition, the paths 18, 20, 22 and 24 include second rows 30 of colored lights 32, 34, 36 and 38 spaced therealong. Each row of white lights 28 is disposed on the left of the corresponding row of colored lights along each base path 18, 20, 22 and 24 when approaching the air terminal 10. The colored lights 32 in the row 30 are blue as indicated at 40 in FIG. 2, the colored lights 34 are green as indicated at 42 in FIG. 2, the colored lights 36 are chartreuse as indicated at 44 in FIG. 2 and the colored lights 38 are an orange red as indicated at 46 in FIG. 2.

In addition to the base paths 18, 20, 22 and 24, the guidance system 16 includes intermediate paths 48, 50, 52 and 54 which radiate outwardly from the air terminal 10 and are equally angularly spaced between adjacent base paths. The intermediate paths 48, 50, 52 and 54 comprise rows of colored lights 56, 58, 60 and 62 and the lights 56 are green as indicated at 42, the lights 58 are chartreuse as indicated at 44, the lights 60 are orange red as indicated 46 and the lights 62 are blue as indicated at 40.

Figure 2:
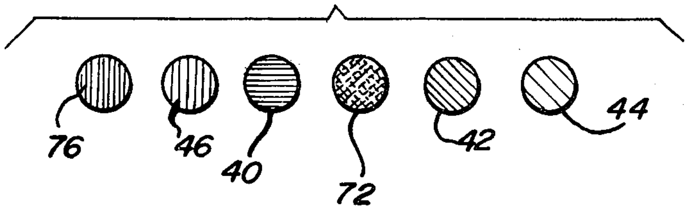
FIG. 2 is a grouping of cross hatchings indicating the various colors of lights which may be used in the guidance system.

In addition to the radial paths of lights, the guidance system 16 includes a plurality of concentric circular paths 64, 66 and 68 extending about the air terminal or airport 10 and the path 64 is defined by spaced lights 70 which are orange in color as indicated at 72 in FIG. 2. The path 66 is defined by spaced lights 74 which are red in color as indicated at 76 in FIG. 2 and the path 68 comprises spaced lights 78 which may be of any other distinctive color.

In operation, when the pilot of an aircraft approaches the general area of the airport or air terminal 10, a distance of 15 miles or greater, the pilot may readily recognize the air terminal area and his position on the periphery thereof according to the color lights which may be viewed. If the pilot approaches the air terminal area from one side and is to land while approaching from the opposite side, the pilot may enter the airport area to the circular path 68 and then follow the lights 78 of the circular path 68, in a predetermined direction, about the air terminal area to the opposite side thereof and then approach along one of the lighted radial paths in a predetermined manner.

Further, if a pilot is approaching the air terminal on a compass heading between adjacent radial paths in low visibility conditions and one of the adjacent radial paths becomes viewable to him, he may then move to the right or left until the other adjacent radial path becomes viewable and thereafter continue inward toward the terminal 10. Of course, while approaching the terminal 10 between two adjacent radial paths if the rows of lights on opposite sides of the aircraft are the same color, the pilot will know that he is approaching the air terminal 10 on the right of a base radial path and if the adjacent lights on the right side of the aircraft are white and a different color in relation to the color on the left side of the aircraft, the pilot will know that he is approaching the air terminal 10 on the left of a base radial path. Of course, the concentric circular paths 64, 66 and 68 are readily viewable to the pilot of an aircraft to indicate the remaining distance to the air terminal 10.

One of the major improvements of this system over existing systems resides in the fact that the present system may indicate a number of things to a pilot without the necessity of radio communication. This may be done through the use of the lights 32, 34, 36 and 38 as well as the lights 56, 48, 60 and 62, either through a sequencing process (landing runways, take-off runways, etc.), a flashing process (emergency in progress, dangerous obstacle ahead, etc.), brightening or dimming the lights or turning off the lights (runway closed, etc.). The ability to control the lights either manually or through a computer lends great flexibility to aircraft controllers. It would be possible, for example, to follow an aircraft in an emergency or without radio contact all the way along his flight path simply by flashing the lights under him as he proceeds inbound toward the runway. This would not only aid the pilot in his approach, but it would also show other aircraft his location in the pattern. Of course, any suitable manual or computer controlled system may be utilized for sequencing the lights, flashing the lights, brightening the lights, dimming the lights or turning the lights off.

It is also pointed out that the rows of double lights 32, 34, 36 and 38 need not always exactly correspond with the cardinal headings but may follow a runway, curve around an obstacle, or veer sharply to avoid nearby airports, etc. However, whether the double rows of lights 32, 34, 36 and 38 follow straight cardinal headings depends upon the airport location and existing local conditions. However, the principle of using the lights to guide incoming and/or outgoing aircraft remains the same.

Because it would be relatively inexpensive to equip substantially all airports with the system of the instant invention, the greatest benefit which may be realized from this system would be substantially increased standardization. Such standardization would enable substantially all pilots to be familiar with the necessary guidance and instructions relative to landing and take-off procedures which pertain to a particular airport, even if the pilot is not familiar with that airport.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an airport area including various relatively angled runways disposed within said area and subject to use by different aircraft with various sophistication levels of guidance equipment and piloted by persons having various levels of experience, a guidance lighting system including a plurality of generally radially arranged base paths spaced and extending outward from said airport area at substantially ground level and having first approach light means spaced therealong for guidance of aircraft along said base paths when aproaching said airport, said approach light means spaced along each base path emitting the same color distinctive light, the light means of each of said base paths being distinctly different in light emitting color from the color light emitted from the light means spaced along the other base paths, each path of distinctive color light emitting lights means extending outward from said airport area in a predetermined compass direction from said airport area, said base paths equalling four in number and being equally angularly displaced about said airport area, said system also including intermediate radial paths of spaced additional light means, said intermediate paths being equally angularly spaced between adjacent base paths and extending generally radially of said airport area, the light means of each of said base paths includes pairs of lights spaced therealong and disposed in side-by-side rows of lights extending along the corresponding base path, a first row of each pair of rows of lights comprising said first approach light means, the second rows of each pair of rows of lights emitting the same color light distinctively different from colors of the first rows of lights, each row of one set of corresponding rows of lights being disposed to the right of the corresponding other row when viewed while moving along side-by-side rows of lights radially inwardly along the corresponding radial base path, the light means of each intermediate path emitting the same color light corresponding in color to the color light emitted from the distinctive color light emitted from the adjacent base path row of distinctive color lights.

2. The combination of claim 1 wherein the four compass directions in which said base paths extend outward from said airport are north, east, south and west.

3. The combination of claim 1 wherein said guidance lighting system includes a plurality of concentric circular and substantially ground level paths extending about said airport at predetermined distances from the center of said airport and which are crossed by said base paths, said circular paths including further light means spaced therealong, the further light means of each circular path emitting a color light distinctive relative to the color light emitted from each of the other further light means and from each of the first light means.

* * * * *